United States Patent [19]
Burns et al.

[11] Patent Number: 5,931,947
[45] Date of Patent: Aug. 3, 1999

[54] SECURE ARRAY OF REMOTELY ENCRYPTED STORAGE DEVICES

[75] Inventors: Randal Chilton Burns; Edward Gustav Chron, both of Sunnyvale; Darrell Long, Soquel; Benjamin Clay Reed, San Jose, all of Calif.

[73] Assignee: International Business Machines Corporation, Armonk, N.Y.

[21] Appl. No.: 08/927,775

[22] Filed: Sep. 11, 1997

[51] Int. Cl.[6] ............................. G06F 12/14; G06F 13/00
[52] U.S. Cl. ........................................................... 713/201
[58] Field of Search ............................... 707/9, 10, 103; 713/201

[56] References Cited

U.S. PATENT DOCUMENTS

| | | | |
|---|---|---|---|
| 5,175,852 | 12/1992 | Johnson et al. | 395/600 |
| 5,349,643 | 9/1994 | Cox et al. | 380/25 |
| 5,475,819 | 12/1995 | Miller et al. | 395/200.03 |
| 5,495,533 | 2/1996 | Linehan et al. | 380/21 |
| 5,500,897 | 3/1996 | Hartman, Jr. | 380/25 |
| 5,550,976 | 8/1996 | Henderson et al. | 395/200.06 |
| 5,617,568 | 4/1997 | Ault et al. | 395/612 |
| 5,638,448 | 6/1997 | Nguyen | 380/29 |
| 5,781,725 | 7/1998 | Saito | 713/201 |
| 5,809,145 | 9/1998 | Slik et al. | 713/201 X |

FOREIGN PATENT DOCUMENTS

| | | | |
|---|---|---|---|
| 08297638 | 11/1996 | Japan | G06F 001/00 |

OTHER PUBLICATIONS

G. Gibson et al., "File Server Scaling with Network–Attached Secure Disks", Proceedings of the ACM International Conference on Measurement and Modeling of Computer Systems (Sigmetrics '97), Seattle, Washington, Jun. 15–18, 1997.

"Network–Attached Secure Disks (NASD)", Computer Science Department, Carnegie Mellon University, Web page, http://www.cs.cmu.edu/Groups/NASD/.

H. Krawczyk et al., "HMAC: Keyed–Hashing for Message Authentication", Network Working Group, RFC 2104, HMAC, Informational, Feb. 1997.

*Primary Examiner*—Thomas M. Heckler
*Attorney, Agent, or Firm*—Khanh Q. Tran

[57] ABSTRACT

A network storage device is disclosed for use in a secure array of such devices to support a distributed file system. Each device is an independent repository of remotely encrypted data objects to be accessed by authorized network clients. All encryption is done by the clients, rather than by the devices. In order for the system to revoke access to an object on the device, the object must be re-encrypted. Each storage device has a device owner for controlling access to the device's data. All data requests from the clients and responses to them are authenticated using keys derived from the owner key and hashed message authentication codes.

1 Claim, 5 Drawing Sheets

SECURE ARRAY OF REMOTELY ENCRYPTED STORAGE DEVICES

CROSS REFERENCE TO RELATED APPLICATIONS

This application contains materials related to an application for "A Decentralized Remotely Encrypted File System," by R. Burns et al., Ser. No. 08/927,772, filed concurrently with this application, commonly assigned, and incorporated by reference herein.

FIELD OF THE INVENTION

The present invention relates generally to distributed data processing. More particularly, the invention relates to a system of remotely encrypted data storage devices for providing secure data sharing among networked clients in a distributed file system.

BACKGROUND OF THE INVENTION

Distributed file systems allow networked computers (referred to as clients) to access remote storage devices as if the devices were on a local file system. These file systems allow for sharing of data among networked clients. Additionally, a user can access the networked data from other networked computers in the same way she accesses it from her own computer. This type of network file sharing is becoming increasingly prevalent as the computing industry becomes more network centric.

Distributed file systems have many security problems that local file systems do not have. The network itself is susceptible to security risks such as snooping (unauthorized break-ins), spoofing (impersonation), and packet eavesdropping (unauthorized receipt of data being transmitted over the network). The identity of a network client can be spoofed such as where a user id can be forged in requests to a file server. In addition, the distributed file systems still have the vulnerabilities of the local file systems. The disk containing file data can be stolen and mounted on another machine, bypassing the protection afforded by the operating system. The distributed file server can be broken into, giving the attacker root access to the disk. Backup tapes are not generally encrypted, and data is easily accessed if they are stolen.

There are three security areas that existing distributed file systems either fail to address, or address inadequately: confidentiality, integrity and authentication. Confidentiality refers to the requirement that the file system data can only be read by the parties that are intended to have access to the data. Integrity means that it is possible for the parties accessing the data to verify that the data read was not altered. Authentication requires that the exchanges between the data repositories and the file system clients are done such that both parties of the exchanges are able to verify the messages involved came from the other.

Network File System (NFS) was an early network file system that has gained wide spread adoption. (See, for example, reference 1). When NFS was introduced, it relied on the operating system to enforce confidentiality, integrity, and authentication. It allowed users to access the network file system as if it were a local file system. Network communications were unencrypted and unauthenticated. The administrators of the local machine could become any user on the machine and gain access to the users files. Other machines on the network could disguise as another machine and fool the NFS server. Since packets were not encrypted across the network, an eavesdropper could view and alter the contents of the packets. Authentication was later added to version 3 of the NFS protocol.

Another file system, the Andrew File System (AFS, reference 2), and its follow-on Decorum File System (DFS, reference 3) are other network file systems that allow users access to the file systems as if they were local file systems. AFS relies on the authorization service Kerberos (reference 4) to authenticate exchanges between the network client and the file system. AFS does not encrypt the file system data. So, an eavesdropper can view the data that is requested or sent to an AFS server. Version 1.2 of DFS added the option of encryption and integrity guarantees (reference 5).

Cryptographic File System (CFS, reference 6) is a file system that acts as a local file system and uses another shadow file system as a repository of data. Each directory of the file system has an encryption key associated that is used to encrypt important meta-data (such as filenames and symbolic links) and file data. CFS uses a modified Data Encryption Standard (reference 7) to perform the encryption. Data is encrypted and then stored in the shadow file system. Each file in CFS has a corresponding file in the shadow file system. Using NFS as the shadow file system allows CFS to act as a network file system. Since the shadow file system is the repository of data, it must provide authentication for changes to the files. If NFS is used as the shadow file system, for example, CFS can be subject to replays (i.e., a copy of the data is presented to pretend that it is coming from the originator).

In general, the above-described distributed file systems run on general purpose hardware and general purpose operating systems. There has been work done to design hardware and operating systems specifically for file serving. An example of this is the "file server appliance" described in reference 8. Special purpose file servers are able to outperform file servers running on general purpose platforms because they can be optimized for file serving. However, these file servers are still left with the security problems inherent in the distributed file systems they are supporting.

Other storage device configurations are defined in the Serial Storage Architecture (SSA, reference 9) and Fibre Channel Arbitrated Loop (FCAL, reference 10) to allow a network of the devices and host computers to share resources. These types of storage networks are inherently private. Thus, many of the above security problems can be ignored (and not adequately addressed) where the hosts and devices attached to the storage network are trusted.

Architectural convergence of LAN and I/O devices is occurring because one interconnect can often satisfy both environments. The network is emerging as the future "backplane" of high-performance systems. Studies have shown that attaching storage devices to an area network can reduce the load on file servers, resulting in improved performance of the distributed file system (reference 11). Traditionally, storage networks such as SSA and FCAL are isolated networks. Isolated networks limit access to only the hosts and devices directly connected to the network. In general, local area networks are interconnected to other networks. The interconnection of networks make it more difficult to limit access to hosts and devices. In particular, TCP/IP is vulnerable to a variety of security attacks. Often, proposals to LAN-attached storage devices ignore the security implications of controlling device access in this more vulnerable environment. In reference 11, Gibson et al. propose using time-limited capabilities and secure coprocessors to establish a secure communication channel to the storage device, in which the security of the data on the device rests with the security of the coprocessor.

Accordingly, there is still a need for a secure network of storage devices that can support a distributed network file system in which data can be moved, archived, and backed up in a secure manner, files can be securely copied directly from one device to another, and all data encryption is handled by the clients rather the devices to overcome the above-described security problems.

REFERENCES

1. Sandberg, R., et al., "Design and Implementation of the Sun Network Filesystem," USENIX Conference Proceedings, USENIX Association, Berkeley, Calif., Summer 1985.

2. Howard, J. H. et al., "Scale and Performance in a Distributed File System, ACM Transactions on Computer Systems", Vol. 6, No. 1, February 1988.

3. Kazer, M., et al., "DEcorum File System Architectural Overview", USENIX Summer Conference, June 1990.

4. Steiner, J. G., "Kerberos: An Authentication Service For Open Network Systems," Winter USEIX, 1988, Dallas, Tex.

5. Everhart, C., "Security Enhancements for DCE DFS", OSF RFC 90.0, February 1996.

6. Blaze, M., "A Cryptographic File System for Unix", First ACM Conference on Communications and Computing Security, November 1993.

7. Data Encryption Standard, National Bureau of Standards, Federal Information Processing Standards Publication Number 46, National Technical Information Service, Springfield, Va., Jan. 15, 1977.

8. Hitz, D., et al., "File System Design for an NFS File Server Appliance", 1994 Winter USENIX, January 1994.

9. ANSI X3.294-1996, "Information Technology - Serial Storage Architecture SCSI-2 Protocol".

10. ANSI X3.272-1996, "Information Technology - Fibre Channel - Arbitrated Loop (FC-AL)".

11. Gibson, G. A., et al., "File Server Scaling with Network-Attached Secure Disks", Proceedings of the ACM International Conference on Measurement and Modeling of Computer Systems (Sigmetrics '97), June 1997.

SUMMARY OF THE INVENTION

The present invention relates to a secure array of network storage devices and method for storing, accessing, and updating data stored on those devices in secure manner. The devices and methods facilitate the implementation of distributed file systems. Data is made accessible only to authorized network clients. The network client performs all encryption and decryption of data and metadata. The storage devices themselves do not have encryption, but serve as an authenticated repository of data. Backup, migration or replication of data is performed by copying the contents of a storage device, a file system or a file. Data and/or metadata always remains secured while in transit.

The advantages offered by this approach include:

Secure movement of data and metadata between the network client and the network storage device.

Possession of either a network storage device or a backup of a storage device, file system or file does not permit access to data or metadata.

The array of network storage devices can be comprised of existing direct-access disk drives, optical drives, tape devices, or a combination of such devices.

Files can be copied directly from one storage device to another storage device in a secure manner. The network clients only involvement would be to initiate the action. Also, since data transfer is directly device to device the overhead to the network client is minimal.

Backup, archive and migration of data and metadata is secure.

The present invention achieves the foregoing and other objects by providing an array of network storage devices that serve as repositories of remotely encrypted data, where each network storage device is an independent entity. All encryption is done by the network clients rather than by the devices.

Each network storage device in the array has a device owner for managing access to the device's data. It also sets up subscribers who can create objects on the device. The owner typically includes an owner key, a device nonce, and a nonce history. The owner key is used for deriving authentication keys. The device nonce is used for guaranteeing freshness of the requests of the clients, and is changed after each request. The nonce history contains a list of recent nonces and the hashed message authentication codes used with them. The owner key and the device nonce are typically implemented in the firmware area of the storage device, and are usually shipped with the device to a user. The device also includes a storage media and a request processor. The storage media contains a list of subscribers that are able to create objects on the device, and a repository of network objects. Each object has a unique id.

The request processor receives requests from the network, services them, and returns responses to the clients. Each request specifies an object id and a byte range, which is into sectors on the device. To read or write directory entries onto a device, a request includes an object id, an entry tag, and a lookup key. In the case of read, the request specifies a range of directory entries.

Network objects are used to store data on the storage devices. There are two types of network objects: directory data objects and file data objects. File data objects contain all or part of the file data of a file. Directory data objects contain all or part of the directory entries of a directory. Each network object on a device is identified by a unique object id.

Requests to a network storage device need to be authenticated and guaranteed for freshness. A request that will change the state of the storage will be authenticated by the device, rather than the client. The results of a request needs to be authenticated by the network client to prevent spoofing problems. The authentication of the results and access rights is done using hashed message authentication codes (HMACs), such as those described in "*HMAC: Keyed-Hashing for Message Authentication*," Request for Comments No. 2104, by Krawczyk et al., Network Working Group, Feb., 1997 (hereinafter, Krawczyk et al.).

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be described in terms of a remotely encrypted device for use in an array of like devices to support a secure distributed file system, and methods for storing, sharing, updating, and accessing file data stored in such a system. However, persons skilled in the art will recognize that a processor, a process controller, or a distributed computing system, which includes data storage and suitable programming means for operating in accordance with the devices and methods to be disclosed, also falls within the spirit and scope of the invention. In addition, the invention may also be embodied in a computer program product, i.e., a computer-readable medium such as a diskette. Such a product may be intended, manufactured, or sold for use with a suitable data processing system. Programming means for directing the data processing system, with which the product is to be used, to execute the steps of the methods of the invention, is written on the recording medium in a form read by the data processing system.

The network storage devices of the present invention address the security issues associated with a distributed file system, in which the devices are attached to a local area network (LAN) as well as other network types. These devices include direct-access disk drives (DASDs), optical storage disks, tape drives, computers or instruments that include means for storing data, or a combination of them. The devices form a secure computer system to allow secure movement of data and metadata between a network client and a network storage device such as in data backup, archive and migration operations. Possession of either a network storage device or a backup of a storage device, file system or file does not permit access to data or metadata. Data files can be copied directly from one storage device to another device in a secure manner. The network client's only involvement would be to initiate the copying action. Also, since data is transferred directly between the devices, the overhead to the network client is minimal.

To achieve the above goals, the network storage devices of the invention are used as repositories of remotely encrypted data, where each network storage device is an independent entity. All encryption is done by the network clients (the components of the network that request data from the devices), so that data that travels over the network is stored encrypted. The advantage of this approach is that data is encrypted or decrypted by the clients as opposed to having the encryption being done at both the devices and the clients. In order for the system to revoke access to an object (file or directory) on the device, the object must be re-encrypted.

Figure 1:
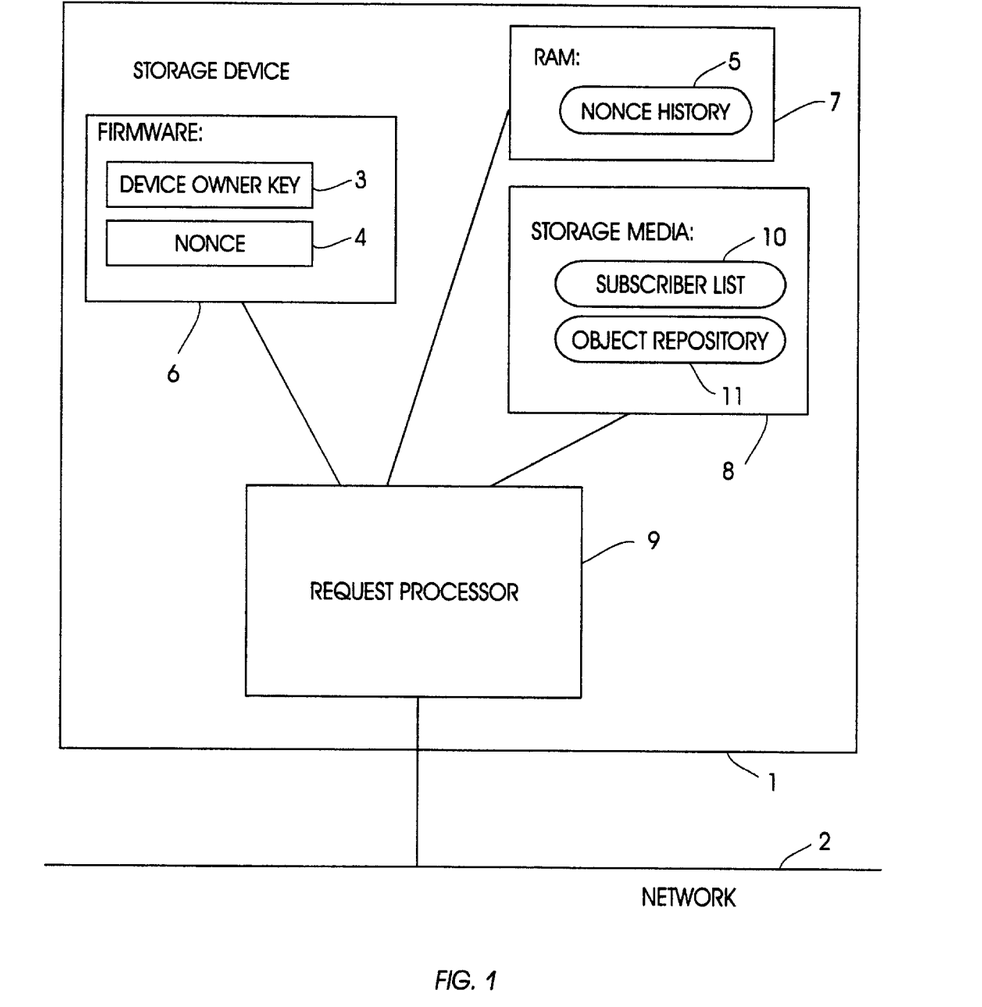
FIG. 1 is a simplified block diagram of a network storage device in accordance with the invention.

FIG. 1 is a block diagram of a network storage device 1, which is part of the secure array of encrypted devices, according to the invention. The device 1 is one of many similar devices attached to a network 2, along with the network clients (not shown). Each storage device 1 has a device owner for controlling access to the device's data. The device owner sets up subscribers who are authorized to create objects on the device and typically includes an owner key 3, a device nonce 4, and a nonce history 5. The owner key 3 is used for deriving authentication keys, as described below and illustrated in FIG. 3. The device nonce 4 is used for guaranteeing freshness of the requests of the clients, and is changed after each request. The nonce history 5 contains a list of recent nonces and hashed message authentication codes (HMACs) that were used with them. HMACs are described, for example, by Krawczyk et al. The determination of freshness of the requests and the updating of the nonce history 5 are described below in reference to FIG. 4. The owner key 3 and the device nonce 4 are typically implemented in the firmware area 6 of the storage device 1, and are usually shipped together with the device 1 to its user. The nonce history 5 preferably resides in the random-access-memory (RAM) area 7 of the device 1.

The device 1 also includes a storage media 8 and a request processor 9. The storage media 8 contains a subscriber list 10 and an object repository 11. The subscriber list 10 includes the subscriber ids of the clients that are able to create objects on the device, while the object repository 11 houses the network objects. Each object will have a unique id that will never be used again on this device even if the object is deleted. Details on the layout of the network objects are described below in reference to in FIG. 2. The request processor 9 receives requests from the network, services them, and returns responses as provided in the flowchart of FIG. 4. A request is a command sent by a client to a network storage device to access data stored on it. The request specifies an object id and a byte range. The network storage device 1 is responsible for mapping the byte range in the request to sectors on the device (i.e., corresponding units of data stored on the storage media 8). To read or write directory entries, a request is also sent to a network storage device. Such a request specifies an object id, an entry tag, and a lookup key. In the case of read, the request specifies a range of directory entries. Again, the network storage device is responsible for mapping the directory entries in the request to sectors on the device.

NETWORK OBJECTS

Network objects are used to store data on the storage devices. There are two types of network objects: directory data objects and file data objects. File data objects contain all or part of the file data of a file. Directory data objects contain all or part of the directory entries of a directory. Each network object on a device is identified by a unique object id. Note that an object id is not reused even if the corresponding object is deleted. Each object has an object administrator key, which is used to create the lookup, read, extend, delete, and update keys for the object. The backup key is derived from the owner key 3 and is used to enumerate the objects on the storage device 1 and read those objects. This granularity of access allows a subscriber to create an object and delegate write authority to another user without having to also give the user the ability to grow the object. Table 1 below lists the access rights for the various components in the device 1.

Figure 2:
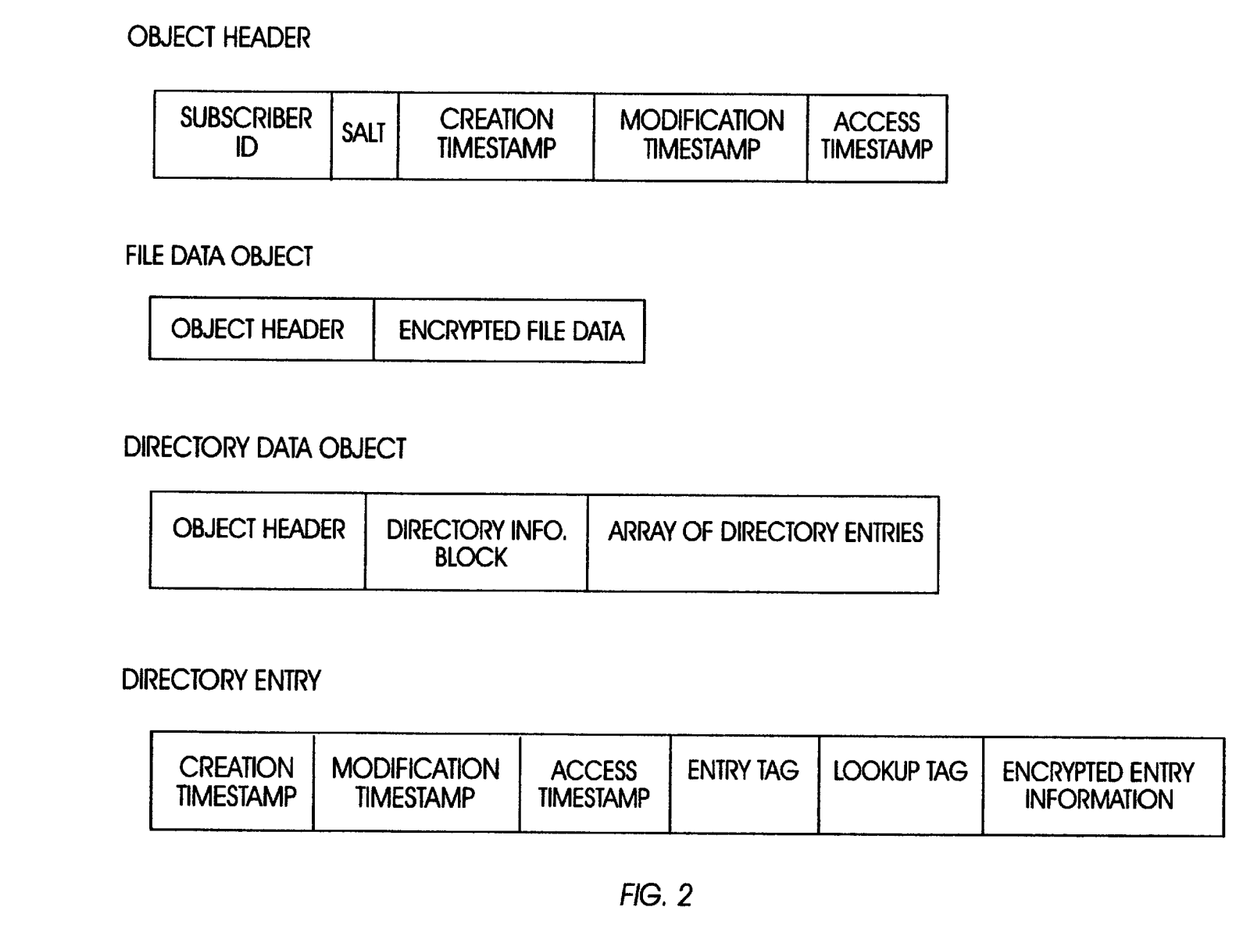
FIG. 2 shows the structure of the network objects in accordance with the invention.

FIG. 2 shows the preferred formats for the file data objects and directory data objects in the repositories, according to the invention. Both types of network

TABLE 1

The accesses rights and corresponding capabilities for the storage device.

| ACCESS RIGHT | CAPABILITIES |
| --- | --- |
| Owner | Create/Delete subscribers |
| Subscriber | Create objects on the device |
| Object Administrator | Create extend, read, write, delete keys for a given object |
| Extend | Increase or truncate the size of the object |
| Read | Read from the object |
| Entry Change | Change or delete a directory entry |
| Update | Change the object |
| Delete | Delete the object |
| Backup | Enumerate the objects on the device Read objects from the device | objects use a common object header. The format of the common header for both file and directory data objects is shown in FIG. 2. The first header field is a subscriber id, which represents the identification of the subscriber that created the object (i.e., its owner). This field is set by the storage device on object. The second field is a salt (a random data item) that is used to affect the generation of an object administrator key. To generate a new object administrator key, only the salt has to be changed. The third field is a timestamp which specifies the time of creation of the object on the storage device. The creation timestamp is set by the storage device. The fourth field is a modification timestamp that is updated by the storage device 1 whenever the object is changed. The fifth header field is the access timestamp that is updated by the storage device whenever a read is performed on the object.

Each file data object, also shown in FIG. 2, preferably includes the common network object header followed by encrypted file data. The network client is responsible for performing encryption and decryption of file data. Encrypted file data is seen simply as a random string of bytes by the network storage device.

A directory data object, also shown in FIG. 2, preferably includes of a common network object header followed by an encrypted directory information block and an array of directory entries. The network client is responsible for performing encryption and decryption of the directory information block. FIG. 2 also shows a preferred structure of a directory entry. Each directory entry has a creation time stamp, modification time stamp and access time stamp that is maintained by the storage device on entry creation, update, and read. The access time stamp is followed by an entry tag. The entry tag is set by the storage device on object creation. The tag is unique in the directory data object and is not reused by the directory data object. The entry tag is followed by the lookup tag of the directory entry. The lookup tag can be changed by the network client, but must be unique in the directory data object. The lookup tag is followed by the entry data which is opaque to the device

FRESHNESS AND AUTHENTICATION

Requests to a network storage device need to be authenticated and guaranteed for freshness. The storage device also enforces access rights listed in Table 1 above. A request that will change the state of the storage will be authenticated by the device, rather than the client. The results of a request needs to be authenticated by the network client to prevent spoofing problems. Furthermore, all requests and responses must also be guaranteed fresh to prevent replays (i.e., presenting of copies of requests and responses by some other entities in the system to impersonate the true requester or recipient). The authentication of the results and access rights is done using Hashed message authentication codes (HMACs), such as those described in Krawczyk et al., for improved performance. Freshness is guaranteed using nonces in the HMAC. Since the network storage device does not have any encryption capability, HMAC keys can't be exchanged via the network. Typically, the network storage device is shipped with a device owner key in firmware and the owner is given the key with the device upon purchase. All keys pertaining to access to the device are derived from the owner key.

KEY DERIVATION

Figure 3:
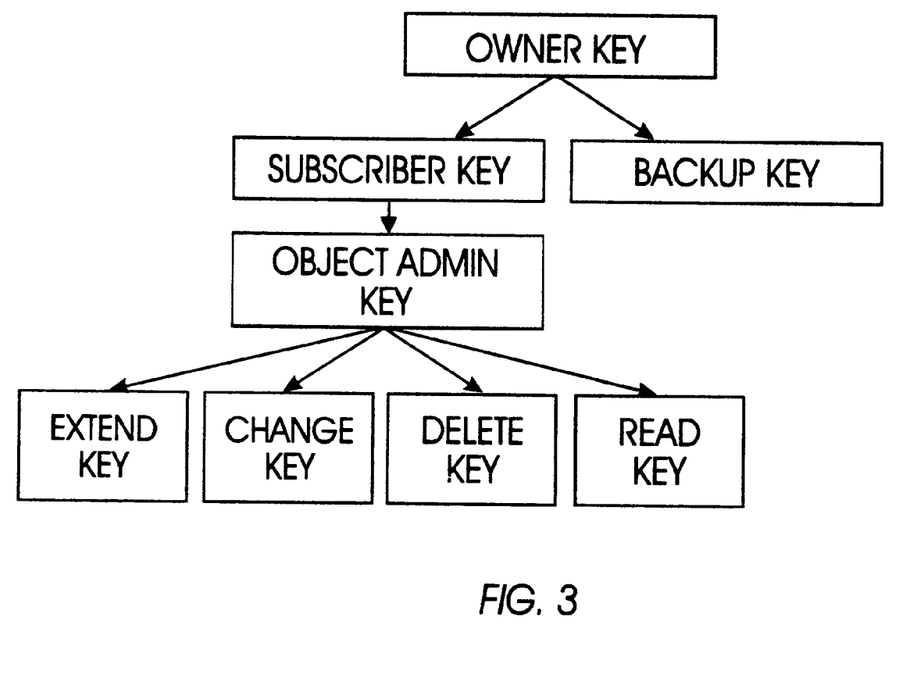
FIG. 3 shows the relationships among the authentication keys used by the device and data access methods of the invention.

FIG. 3 shows the relationship of the HMAC keys to each other. The derivation of access keys from the owner key is done using published formulas and involve shared secrets so that key exchange over the network doesn't have to take place. Table 2 shows how the keys to the access rights (from Table 1) are derived. The basis of the derivation is the one-way-ness and randomness of the hash function (H()), where sid is the subscriber id, oid is the object id, and uid is the user id used by the network client. The hash function is expressed as having variable number of arguments. To use standard hash functions, the arguments are concatenated and then hashed. Examples of standard hash functions are described in "The MD5 Message Digest Algorithm", by Rivest, R. L., Request For Comments 1321, April 1992, and "Security Enhancements for DCE DFS", by Everhart, C., OSF RFC 90.0, February 1996.

TABLE 2

Derivations of device keys

| ACCESS KEY | DERIVATION |
| --- | --- |
| Owner (Ko) | Shipped with device |
| Subscriber (Ks[sid]) | H(Ko,sid) |
| Object Administrator (Ka[oid]) | H(Ks[sid],oid) |
| Extend (Kx[oid]) | H(Ka[oid],'x') |
| Read (Kr[oid,uid]) | H(Ka[oid],uid,'r') |
| Lookup (Kl[oid,uid]) | H(Ka[oid],uid,'l') |
| Update (Ku[oid]) | H(Ka[oid],'u') |
| Delete (Kd[oid]) | H(Ka[oid],'d') |
| Backup (Kb) | H(Ko,'b') |

NONCES

Both the network clients and storage devices need to guarantee the freshness of the requests and responses to avoid replay attacks. Network clients guarantee freshness of the responses by generating a nonce. Nonces are numbers that are generated at random and used only once. They are included in the requests. The freshness of a response is validated by verifying that the nonce was used in the HMAC of the response. Storage devices guarantee freshness of a request by validating that its own nonce is included in each request's HMAC.

The device 1 changes its nonce after each request. A network client can request the device's nonce at any time. This request is an exception to the rule that the device nonce is included in all requests. To allow concurrent use of a device nonce, the storage device will keep a short history of recent nonces and the HMACs used with them. A request is considered a replay under one of two circumstances: a request arrives with a device nonce that is not current and not in the history, or the request has a nonce and HMAC with is already in the history. Otherwise, the request is accepted and added to the nonce history.

Figure 4:
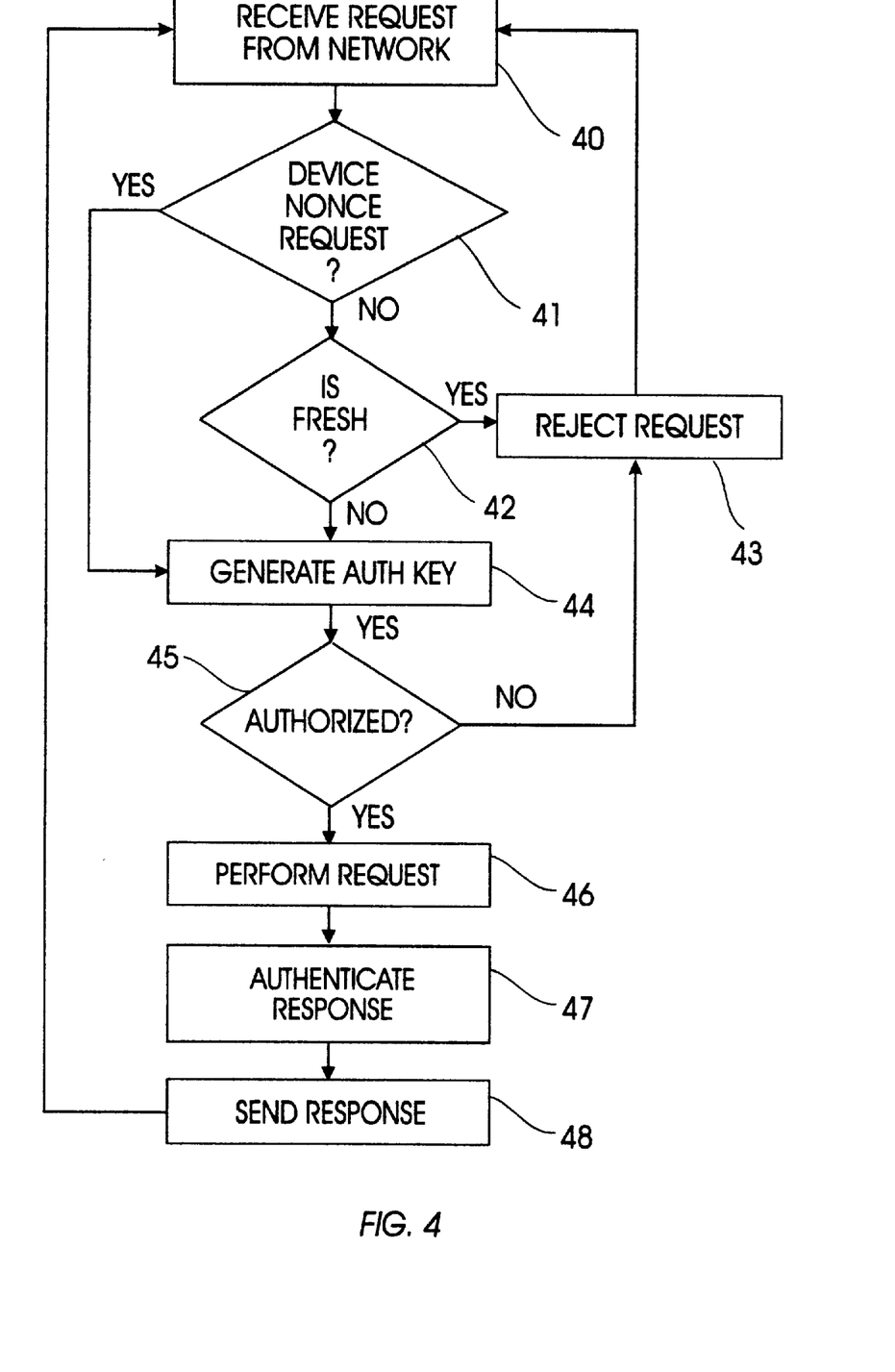
FIG. 4 is a flowchart representing showing an operational sequence of a preferred embodiment for the request processor in FIG. 1, for processing requests from the network clients.
Figure 5:
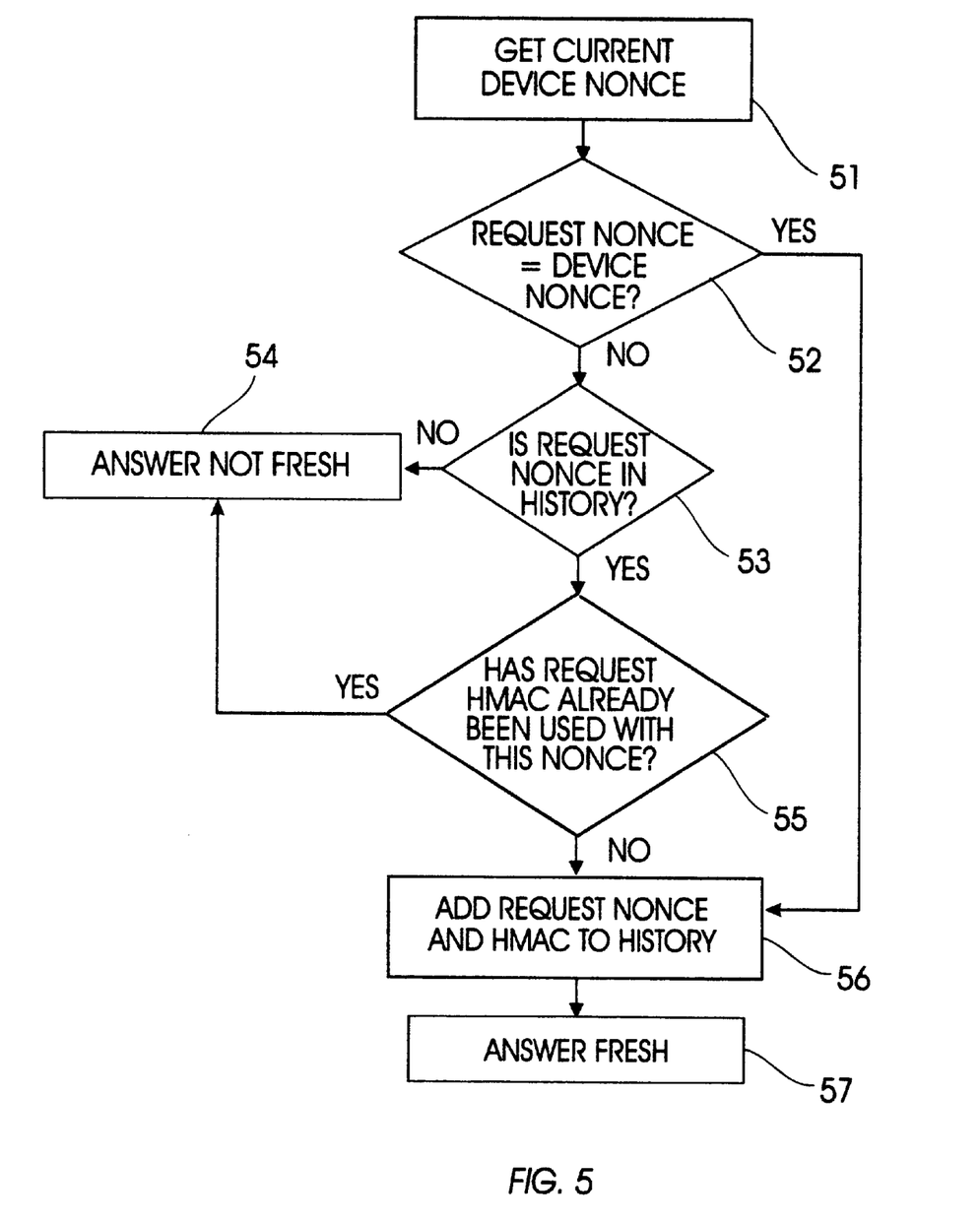
FIG. 5 is a flowchart representing an operational sequence of a preferred embodiment of step 43 in FIG. 4, for determining the freshness of a client request.

FIG. 4 is a flowchart showing an operational sequence of a request processor 9 for processing requests from the network clients. Starting with step 40, a request from the network is received at the storage device 1. If the request is for the device nonce (as determined in step 41), control is transferred to step 44. Otherwise, in step 42, the request is checked for freshness. FIG. 5 shows further details of step 42, for determining the request's freshness. If the request is not checked, a rejection is sent to the network client in step 43. Step 44 generates the appropriate authentication key for the request type. The derivation of the authentication key was described earlier in reference to Tables 1–2 and FIG. 3. In step 45, the processor 9 checks the HMAC used in the request with the HMAC generated by the key from step 44 to authenticate the request. It also verifies that the authentication key used is authorized for the request. If the client is authorized, the request is performed in step 46; otherwise, a rejection is sent to the network client in step 43. Once the request is performed, an HMAC is generated in step 47 from the response (generated in step 46) and the authentication key (generated in step 43). Finally, the response and the HMAC are sent to the network client in step 48.

FIG. 5 is a flowchart showing an operational sequence for a preferred embodiment of step 43 in FIG. 4, for determining the freshness of a client request. The current device's nonce is first obtained in step 51. This current device's nonce is compared to the nonce in the request in step 52. If they are equal, then the request is fresh and the control is passed to step 56. Otherwise, the nonce of the request is looked up in the history file, in step 53. If it is not in the history file, then control is passed to step 54, where the request is declared not fresh. If the request nonce is in the history file, step 55 determines whether the HMAC in the request is also in the history file. If it is, control is passed to step 64 where the request is declared not fresh. Otherwise, the request is added to the history file in step 56. The request is then declared as fresh in step 57.

PROTOCOL DIALOGS

The following commands are preferred embodiments of the protocol dialogs between a client (C) and a network storage device (D). The notation C—>D means that a command is sent by C to D.

Device nonce requests

Device nonces are used by the storage device to guarantee freshness of requests. The following protocol is used for a client (C) to request the nonce from a network storage device (D). The parameter keytype is the type of key (owner, administrator, update, etc.) used in the HMAC of the response. If the key has a user id, subscriber id, and/or object id associated with it, then the relevant ids will be in the parameter keydata. The parameter $I_c$ is a nonce generated by the client to assure freshness of the response.

C—>D:

RequestNonce, $I_c$, keytype, keydata

The response contains the information included in the request along with a current nonce ($I_d$) of the storage device.

D—>C:

Nonce, $I_d$, $I_c$, keytype, keydata, H(Nonce, $I_d$, $I_c$, keytype, keydata, $K_{keytype}$)

The client can guarantee freshness of the response by verifying that the nonce it sent ($I_c$) is included in the hash of the response. The client can then use the device nonce ($I_d$) to make additional requests to the disk.

Error responses

If there is a problem with a request, the storage device will respond with the following error response:

D—>C:

Error, $I_d$, $I_c$, H(request), ecode, edata, H(Error, $I_d$, $I_c$, H(request), ecode, edata, K)

H(request) is the hash of the request that generated the error. ecode is the error code that represents why the request failed. edata is error data that gives specific details about why the request failed. keydata is the data that corresponds to the key used it the request. K is the key that was used in the request. Note, if the request failed due to an invalid key used in the request, keydata and K are not used.

Subscriber requests

Subscribers are clients who can insert objects onto the device. Each subscriber has an id (sid). Table 2 shows that the subscriber key is derived from the subscriber id. Subscribers can only be created and deleted by the device owner. Anyone can enumerate the subscribers of a device. Only subscribers can authenticate the enumeration response. The disk maintains a list of subscribers on the storage media.

Creating subscriber keys

An owner uses the following protocol to create subscriber keys:

C—>D:

AddSubscriber, sid, $I_d$, $I_c$, H(AddSubscriber, sid, $I_d$, $K_o$)

The owner sends the AddSubscriber request with the subscriber id (sid) and the current device nonce. The request is hashed with the owner key to authenticate that the request was made by the owner and the device nonce is included in the request to guarantee freshness. If successful the device responds with:

D—>C:

SubscriberAdded, sid, $I_d$, $I_c$, H(SubscriberAdd, sid, $I_d$, $K_o$)

The device doesn't need to respond with the subscriber key since the client can generate the key.

Querying subscribers

Anyone can get a list of subscribers. The list is not encrypted and is not secret. The caveat is that only subscribers can be guaranteed that the response is fresh. The list is requested using the following protocol:

C—>D:

QuerySubscribers, sid, $I_c$

The subscriber id is sent so that the device will know which key to use when authenticating the message. The nonce ($I_c$) is sent to guarantee the freshness of the response.

D—>C:

Subscribers, sid[0], . . . , sid[n], H(Subscribers, sid[0], . . . , sid[n], $I_c$, $K_s$[sid])

The response contains device subscriber table. The response is authenticated by hashing the results with the administrators key, and freshness is guaranteed by including the nonce sent with the query request in the hash.

Deleting a subscriber

The owner can remove a subscriber by:

C—>D:

RemoveSubscriber, sid, $I_c$, $I_d$, H(RemoveSubscriber, sid, $I_c$, $I_d$, $K_o$)

The delete request is authenticated by including the owner key in the hash and the freshness of the request is guaranteed by including the device nonce. Upon successful deletion of the subscriber the device sends the following:

D—>C:

SubscriberRemoved, sid, $I_c$, $I_d$, H(SubscriberRemoved, sid, $I_c$, $I_d$, $K_o$)

The response indicates to the client that the removal was successful.

Device object requests

To facilitate the creation, processing and deletion of network objects, a number of device object requests are supported.

Creating an object

C—>D:

CreateObject, sid, $I_d$, objtype, size, $I_c$, H(CreateObject, aid, $I_d$, objtype, size, $I_c$, $K_s$[sid])

A subscriber requests an object to be created by giving the object type and size. Currently the object can either be a directory object or a file object. The request is authenticated by hashing with the subscribers key and the freshness is guarantee by including the device nonce in the hash.

D—>C:

ObjectCreated, oid, $I_c$, H(ObjectCreated, $I_c$, oid, $K_a$[oid])

An object of the given size is created on the device and its object id is returned in the response. The response is authenticated with the object administrator key ($K_a$[oid]) and freshness of the response is guaranteed by including the nonce used in the request in the hash. The subscriber is able the check the hash by generating the object administration key. The creation timestamp and modification timestamp of the object are initialized by the device.

Extending an object

C—>D:

ExtendObject, oid, $I_d$, $I_c$, delta, H(ExtendObject, oid, delta, $I_d$, $I_c$, $K_x$[oid])

The object is extended by the delta such that the new size of the object is the old size plus the delta. A negative delta would truncate the object. Including the device nonce in the hash allows the device to check the freshness of the request and the presence of the extend key authenticates the request. The modification timestamp of the object is updated by the device. If the extension is successful the following response is received:

D—>C:

ObjectExtended, oid, $I_d$, $I_c$, newsize, H(ExtendObject, oid, newsize, $I_d$, $I_c$, $K_x$[oid])

The response contains the newsize (newsize) of the object after the extend has been completed.

Deleting an object

C—>D:

DeleteObject, oid, $l_d$, $I_c$, H(DeleteObject, oid, $I_d$, $I_c$, $K_d$[oid])

The object is deleted from the device. If the deletion is successful the device returns the following:

D—>C:

ObjectDeleted, oid, $I_d$, $I_c$, H(ObjectDeleted, oid, $I_d$, $I_c$, $K_d$[oid])

Object statistics

C—>D:

ObjectStat, oid, $I_d$, $I_c$, uid, H(ObjectStat, oid, $I_d$, $I_c$, uid, $K_r$[oid,uid])

The device locates header of the specified object.

D—>C:

Stat, oid, $I_d$, $I_c$, uid, data, H(Stat, oid, $I_d$, $I_c$, uid, data, $K_r$[oid,uid])

The device responds by returning the header of the requested object. The data returned is the six fields of the object header.

Reading an object

C—>D:

ReadObject, oid, $I_c$, uid, offset, length, H(ReadObject, oid, $I_c$, uid, offset, length, $K_r$[oid,uid])

The object is read from the device using the given offset and length. If the object is a directory object, the offset is the index of the directory entry to be read and the length is size of the area defined to hold the directory entries being returned. Otherwise, the offset is a byte offset into the data of the file object. The client passes a nonce that it generated to guarantee the freshness of the response from the device. The user id must be passed to the device so that the device will know which key to use in the hash of the response.

D—>C:

ObjectData, oid, $I_c$, uid, offset, length, data, H(ObjectData, oid, $I_c$, uid, offset, length, H(data), $K_r$[oid,uid])

The device responds with the data read from the device. The inclusion of the nonce from the request guarantees the freshness of the response. Note that in the read exchange the read keys are only used to guarantee freshness not for authentication.

Read file data object with intent to modify

A read can be done to a file data object with a hint to the device that the client intends to modify the device. The protocol is exactly the same is ReadObject, except that ReadWithIntent is used in place of ReadObject.

Changing a file object

C—>D:

ChangeFileObject, oid, $I_d$, $I_c$, offset, data, H(olddata), H(ChangeFileObject, oid, offset, H(data), H(olddata), $I_d$, $I_c$, $K_c$[oid])

The contents of the file object at the offset is replaced with the data that is passed in the request. If H(olddata) is not zero, the change will only be successful if the hash of the data currently stored in the object at the offset to the length of the new data matches H(olddata). If the update is successful, the modification timestamp of the object is updated and the device responds with the following:

D—>C:

FileObjectChanged, oid, $I_d$, $I_c$, offset, H(data), H(FileObjectChanged, oid, offset, H(data), $I_d$, $I_c$, $K_c$[oid])

The client can verify that the data was updated successfully by verifying the hash of the data.

Directory data object requests

Various requests are defined to support the creation, update, processing and deletion of directory entries within a directory object. The format of these requests are given a follows.

Writing directory information

C—>D:

WriteInfo, oid, $I_d$, $I_c$, data, H(WriteInfo, oid, H(data), $I_d$, $I_c$, $K_c$[oid])

The device changes the directory information for the directory data object (oid). If the change is successful, the device responds with the following:

D—>C:

InfoWritten, oid, $I_d$, $I_c$, H(data), H(InfoWritten, H(data), $I_d$, $I_c$, $K_c$[oid])

Reading directory information

C—>D:

ReadInfo, oid, uid, $I_d$, $I_c$, H(ReadInfo, oid, $I_d$, $I_c$, uid, $K_r$[oid,uid])

The device reads the directory information for the directory data object (oid). If the read is successful, the device responds with the following:

D—>C:

DirInfo, oid, $I_d$, $I_c$, uid, data, H(DirInfo, H(data), $I_d$, $I_c$, uid, $K_r$[oid,uid])

Inserting a directory entry

C—>D:

InsertEntry, oid, $I_d$, $I_c$, ltag, size, [data], H(InsertEntry, oid, ltag, size, [H(data)]$I_d$, $I_c$, $K_c$[oid])

The device creates a new entry in the directory data object (oid) with the size and lookup tag (ltag) specified. Optionally the data corresponding to the entry can be supplied. If successful, the device responds with the following:

D—>C:

EntryAdded, oid, $I_d$, $I_c$, etag, ltag, size, H(EntryAdded, oid, etag, ltag, size, $I_d$, $I_c$, $K_c$[oid])

The entry tag (etag) for the new entry is returned to the client.

Changing a directory entry

C—>D:

ChangeEntry, oid, $I_d$, $I_c$, etag, ltag, H(olddata), data, H(ChangeEntry, oid, etag, ltag, H(olddata), H(data), $I_d$, $I_c$, $K_e$[oid,etag])

The device locates entry specified by the entry tag (etag). The device then verifies that the hash of the data that is currently in the entry matches H(olddata). If match is successful, the entry data is replaced with the data in the request, the modification timestamp of the object and the entry are updated and the device responds with the following:

D—>C:
EntryChanged, oid, $I_d$, $I_c$, etag, ltag, H(data),
H(EntryChanged, oid, etag, ltag, H(data), $I_d$, $I_c$, $K_e$[oid, ctag])
  Deleting a directory entry
C—>D:
DeleteEntry, oid, $I_d$, $I_c$, etag, H(ChangeEntry, oid, etag, $I_d$, $I_c$, $K_e$[oid,etag])
  The device locates entry specified by the entry tag (etag). If the entry is found, the entry is deleted and the modification timestamp of the object is updated.
D—>C:
EntryDeleted, oid, $I_d$, $I_c$, etag, H(EntryDeleted, oid, etag, $I_d$, $I_c$, $K_e$[oid,etag])
  Directory entry lookup
C—>D:
EntryLookup, oid, $I_d$, $I_c$, uid, ltag, H(EntryLookup, oid, $I_d$, $I_c$, uid, ltag, $K_r$[oid,uid])
  The device locates the entry with the lookup tag (ltag) of the request. If the lookup is successful the device responds with:
D—>C:
Entry, oid, $I_d$, $I_c$, uid, ltag, data, H(Entry, oid, $I_d$, $I_c$, uid, ltag, H(data), $K_r$[oid,uid])
  The device responds by returning the requested entry. The data returned is the entire directory entry including the timestamps.
Backup
  The backup key is basically a global read key. A network client with the backup key can enumerate all the objects of the device and retrieve any object. Object enumeration requests can include filters for object owner and modification timestamp.
  Enumerate object
C—>D:
EnumerateObjects, $I_d$, $I_c$, sid, mtime, H(EnumerateObjects, $I_d$, $I_c$, sid, mtime, $K_b$)
  If sid is not null, only the ids of objects with the given subscriber will be returned. If mtime is not null, only the ids of objects with a modification time of mtime or later will be returned.
D—>C:
ObjectEnumeration, $I_d$, $I_c$, ids, H(ObjectEnumeration, $I_d$, $I_c$, ids, $K_b$)
ids is an array of object ids that match the filter criteria.
  Backup object
C—>D:
DumpObject, $I_d$, $I_c$, oid, H(DumpObject, $I_c$, oid, $K_b$)
  oid is the object id of the object to be retrieved.
D—>C:
ObjectDump, $I_d$, $I_c$, data, H(ObjectEnumeration, $I_c$, data, $K_b$)
  data is a complete dump of the object. It contains the object header followed by the object data.
Proxy change
  If an object or part of an object is to be copied to another object, one device can issue a change directly to another device without involving the network client. To authorize the change the network client first creates the HMAC used in the change request and then sends the HMAC to the device that will be issuing the change. Once the device has the HMAC it can build a change request that in can issue on behalf of the network client.
C—>D:
InitProxyChange, $I_c$, $I_d$, uid, soid, soffset, slength,
H(InitProxyChange, $I_c$, $I_d$, uid, soid, soffset, slength, $K_r$[soid,uid])
  soid is the object id that is to be copied. soffset and slength are the offset and the length of the region to be copied.
D—>C:
ProxyHash, $I_c$, $I_d$, uid, soid, soffset, slength, dhash,
H(ProxyHash, $I_c$, $I_d$, uid, soid, soffset, slength, dhash, $K_r$[soid,uid])
  dhash is the hash of the data of the region specified by soffset and slength in soid. The client requests the device nonce ($I_p$) from the target device and calculates the HMAC of the change request as follows:

$$HMAC=H(ChangeFileObject, doid, doffset, dhash\ 0, I_p, I_c, K_r[doid])$$

C—>D:
ProxyChange, $I_c$, $I_d$, $I_p$, uid, soid, soffset, slength, doid, doffset, HMAC,
H(ProxyChange, $I_c$, $I_d$, uid, soid, soffset, slength, doid, doffset, HMAC, $K_r$[soid,uid])
  $I_p$ is the device nonce of the target device. doid is the object id of the destination object. doffset is the offset into the destination object. The device will assemble the following request to be sent to the destination object:
ChangeFileObject, doid, $I_p$, $I_c$, doffset, data, 0, HMAC
  The device sends the request to the storage device containing the destination object, and returns the result of the request to the network client.
Quotas
  Quotas can be implemented by adding a quota field and a usage field to the subscriber lists. The storage device can check the quota and update the usage field when an object is created or extended.
Temporary keys
  The keys described above bestow the rights associated with the key for as long as the client is in possession of the key. Temporary keys can be implemented by including an expiration timestamp in the hash used to create the key. When an exchange takes place using the key, the timestamp must be passed along with the other key data (such as userid, oid, etc.). The timestamp is relative to the clock maintained by the network storage device. The storage device should reject any requests using a temporary key whose timestamp is older than the current time.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A network of storage devices for use in a distributed file system, the system including clients sharing data stored on the devices, each device comprising:
  a media for storing data as data objects, the media having a list of subscribers that are authorized to create the data objects on the device;
  a device owner for controlling access to the data objects, the owner having an owner key for authenticating data requests and responses, and a nonce for determining freshness of the requests; and
  a request processor for processing the data requests and returning the responses to the clients.

* * * * *